2,816,073
Patented Dec. 10, 1957

2,816,073

DRILLING FLUID

Charles A. Stratton, Bartlesville, Okla., assignor to Phillips Petroleum Company, a corporation of Delaware No Drawing. Application July 16, 1956,
Serial No. 597,855

28 Claims. (Cl. 252—8.5)

This invention relates to drilling fluids. In one aspect it relates to emulsion drilling fluids of the oil-in-water and water-in-oil emulsion types, and to methods of treating oil and gas wells with such drilling fluids. In a particular aspect it relates to organic quaternary ammonium derivatives of cellulosic compounds and their use in emulsion drilling fluids.

In the art of drilling wells to tap subterranean deposits of fluids, especially when drilling by the rotary method, it is necessary to use a drilling fluid, as is well known by those skilled in such art. The especially prepared drilling fluid must act as a liquid medium of controlled viscosity for removing cuttings from the bore hole; it must prevent excessive amounts of fluid from flowing from the bore hole into surrounding formations by depositing on the wall of the hole a thin but substantially impervious filter cake; it must possess a gel structure of sufficient strength to hold in suspension solids, particularly during any time the fluid is not circulating; it must serve as a weighting material exerting sufficient pressure to counterbalance any pressure exerted by water, gas, oil, or other fluid from a penetrated structure and to prevent caving or other intrusion into the drill hole.

These requirements have been met in the past by employing both aqueous and non-aqueous, or oil-base drilling fluids. The aqueous drilling fluids usually comprise water, colloidal material of both gel-forming and non-gel-forming types, and weighting materials suspended in the water. The non-aqueous, or oil-base drilling fluids, normally consist of a non-aqueous liquid such as crude oil or a petroleum distillate, and a weighting material. Sometimes these oil-base drilling fluids contain a minimum amount of water, e. g., less than 10 percent water. In addition to aqueous and non-aqueous drilling fluids, emulsion-type drilling fluids are often used. These emulsion drilling fluids consist of a substantially water-insoluble liquid, such as oil, a weighting material, such as clay, and water, together with a suitable dispersing or emulsifying agent. The two types of emulsion drilling fluids are the oil-in-water emulsion-type and the water-in-oil emulsion-type; in the former, water or brine forms the continuous phase of the emulsion, and in the latter oil forms the continuous phase of the emulsion. It is the emulsion-type drilling fluids with which this invention is concerned.

A distinct advantage in the drilling fluid art was made when it was discovered that upon addition of certain cellulosic acids and salts thereof, such as the sodium salt of carboxymethyl cellulose, a drilling fluid having extraordinary properties resulted.

An object of this invention is to provide an improved drilling fluid. Another object is to provide an improved method for treating oil and gas wells with such drilling fluids. Another object is to provide improved emulsion drilling fluids, such as the oil-in-water emulsion-type and the water-in-oil emulsion-type, characterized by low filtration rate and viscosity, as well as other desirable drilling fluid properties. A further object is to provide a novel emulsifying agent which will produce stable emulsion drilling fluids. Other objects and advantages of my invention will become apparent, to those skilled in the art, from the following description and appended claims.

I accomplish these and other objects by stabilizing emulsion drilling fluids with certain compounds resulting from the interaction of certain organic quaternary ammonium compounds with certain cellulosic acids and salts thereof. The structural formula for the quaternary ammonium compounds useful in the practice of my invention may be diagrammatically illustrated as follows:

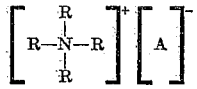

wherein at least one of said R groups is an aliphatic radical preferably an alkyl, having from 8 to 20 carbon atoms, the remaining R groups are selected from the group consisting of lower alkyl radicals and benzyl radicals, and A is an anion, preferably a monovalent anion. Representative anions include hydroxide, chloride, bromide, iodide, fluorine, nitrate, sulphate, secondary orthophosphate, acetate, benzoate, salicylate, and the like.

Representative quaternary ammonium compounds coming within the above structural formula and used in the practice of my invention include:

Octyltrimethylammonium chloride,
Decyltrimethylammonium bromide,
Dodecyltriethylammonium hydroxide,
Tetradecyltrimethylammonium chloride,
Hexadecyltripropylammonium iodide,
Octadecyltributylammonium nitrate,
Octadecenyltriethylammonium chloride,
9-hexadecyltrimethylammonium chloride,
9,12-octadecadienyltrimethylammonium chloride,
9,12,15-octadecatrienyltriammonium acetate,
Didocyldimethylammonium chloride,
Dioctyldimethylammonium chloride,
Didecyldiethylammonium benzoate,
Ditetradecyldimethylammonium chloride,
Dioctadicyldimethylammonium chloride,
Diheptadecyldipropylammonium chloride,
Trioctylmethylammonium chloride,
Dihexadecyldimethylammonium chloride,
Dodecylbenzyldimethylammonium chloride,
Pentadecylbenzyldiethylammonium fluoride,
Octadecylpropyldimethylammonium salicylate,
Dodecylbutylbenzylmethylammonium bromide,
Nonadecyldiethylmethylammonium sulphate,
Eicosatrimethylammonium orthophosphate, and the like.

The above quaternary ammonium compounds are reacted with a cellulosic acid or salt thereof. Useful cellulosic compounds include acid carboxyalkyl cellulose ethers and water-soluble alkali metal, alkaline earth and ammonium salts thereof, such as acid carboxymethyl cellulose and acid carboxyethyl cellulose ethers and sodium carboxymethyl cellulose. The sodium salt is commercially obtainable, being known to the trade as CMC (or NaCMC). It is formed by reacting sodium cellulose with monochloroacetate acid. This cellulosic derivative is available in different viscosity grades which are dependent upon the degree of esterification.

The quaternary ammonium derivative of the cellulosic compound can be obtained as a precipitate by mixing an aqueous suspension of an alkali metal salt of a carboxyalkyl cellulose compound with an aqueous suspension of the quaternary ammonium compound. The precipitate is washed, filtered and dried. The precipitate obtained by reacting sodium carboxymethyl cellulose with "Arquad 2HT," (a di-fatty alkyl quaternary ammonium salt), is a spongy, friable solid having a slightly "waxy" consistency. It is completely water-insoluble. This precipitate will not completely dissolve in oil; however, it demonstrates its oleophilic character by swelling markedly when heated in oil. The novel emulsifiers of my invention are either water-insoluble, oil-soluble, or dispersible in oil.

I have found that the quaternary ammonium derivatives of the cellulosic compounds act as excellent emulsifiers or stabilizers. Emulsion drilling fluids of both the oil-in-water and water-in-oil types can readily be emulsified to form stable emulsions. These emulsions can be used in drilling fluids and can be prepared by the usual mixing methods commonly employed for preparing emulsion drilling fluids. Moreover, the emulsion drilling fluids of my invention can be prepared by preparing the emulsifier "in situ" in an effective and economical manner. This mixing may be done at a convenient place and the emulsion transported to its place of use, or it may be prepared in a mixing device over the mud pit and the emulsion allowed to fall into the pit, or the emulsion may be delivered to any other part of the mud circulating system. This emulsion drilling fluid, so prepared, is circulated and during the drilling a new process of drilling is attained since the emulsion has a low filtration rate, desirable viscosity, and other desirable drilling fluid properties, which expedite the drilling operation.

The present invention contemplates, of course, incorporation in the emulsion drilling fluids the usual mud constituents, as for example, clay and mud solids, and/or weighing agents, depending upon the type of formation encountered during drilling and the results desired. The emulsion drilling fluids may also contain the usual modifying, converting or adjusting agents, such as caustic, quebracho, lime, and the like.

Any type of hydrocarbon oil can be employed, such as crude oil, topped crude oil, various petroleum fractions, such as kerosene, diesel oil, gas oil, heavy fuel oil and blends of such fractions with asphalt or other viscous oils. Particularly useful oil components are highly-branched, heavy alkylate petroleum fractions which consists essentially of isoparaffinic and naphthenic hydrocarbons which are completely saturated. The petroleum fractions are sold under the trade name of "Soltrol." Oil emulsion drilling fluids employing this type of oil component are disclosed and claimed in the pending U. S. Application Serial No. 558,626, filed January 12, 1956, by Charles J. Engle. The clay materials include bentonitic clays which are clays composed of bentonite, a general term for more or less highly swelling clays made up principally of hydrous aluminum, magnesium, and iron silicate. Materials commonly used for weighting purposes include finely divided limestone, barite, lead sulfide, oyster shells, and the like.

The amount of hydrocarbon oil employed in my novel emulsion drilling fluids will depend upon the type of emulsion desired, the amount of the quaternary ammonium cellulosic emulsifier employed, the amount of water, the density of the drilling fluids, the nature of the formation penetrated, and other factors that can be readily determined by those skilled in the art. It has long been customary in rotary well drilling to subject the drilling fluid to simple tests from time to time, which tests indicate the amount of hydrocarbon oil to be employed. Generally, for the oil-in-water emulsion systems of the present invention, the amount of oil component employed will be in the range between 2 to 40 percent by weight of the final emulsion drilling fluid, more preferably in the range between 4 to 20 percent by weight. For the water-in-oil emulsion systems of my invention, the amount of the oil component employed will be in the range between 20 to 95 percent by weight of the final emulsion drilling fluid, preferably in the range between 40 to 60 percent by weight.

The amount of the quaternary ammonium cellulosic compound to be employed in preparing the emulsion drilling fluids of my invention will be dependent upon several factors, such as the amount of oil component, the nature of the particular emulsifier employed, as well as economic considerations and physical data. The particular amount of emulsifier employed will be apparent to those skilled in the art upon being acquainted with my invention. Accordingly, I prefer to define limits of amounts of the emulsifier to be employed in the emulsion drilling fluids of my invention by functional rather than by actual numerical limits. The amount to be used being that necessary to give the results desired, i. e., a tight and stabilizing emulsion. An over or under-dose of emulsifier will still be operative but merely does not produce optimum results. In general, the amount will be in the range between 0.5 and 10 pounds per 42 U. S. gallons barrel of drilling fluid, and preferably in the range between 1.0 and 5 pounds per 42 U. S. gallons barrel of drilling fluid.

In general, the quaternary ammonium compounds can be prepared by the reaction between alkaline halides or sulfates with tertiary amines having at least one long-chain aliphatic radical. The long-chain quaternary ammonium salts are compounds in which four organic radicals are attached to the nitrogen atom of the ammonium ion. A particularly useful series of quaternary ammonium salts are those sold commercially under the trade name "Arquads," such as Arquad C, Arquad 2T and Arquad 2HT.

In preparing the water-in-oil emulsions of my invention I prefer to add a calcium salt (such as calcium chloride) or bentonite to the system since I have found that such materials aid in the stabilization of the emulsion so prepared.

The following specific examples are included herein to illustrate my invention and not to define the limits thereto. The tests of the properties of the emulsions and drilling fluids were all made with standard drilling mud equipment. The viscosity measurements were made with a Fann V–G meter and the water losses were determined with an A. P. I. low pressure well building tester filter press with a pressure of 100 pounds per square inch applied for 30 minutes.

*Example I*

The following experiment was carried out to determine whether or not a quaternary ammonium carboxyalkyl cellulose compound will produce stabilized water-in-oil emulsions having desirable characteristics of a drilling fluid using Soltrol, a non-fluorescent, heavy alkylate hydrocarbon, as the oil component.

Two 0.5 gram portions of sodium carboxymethyl cellulose (NaCMC) were each dissolved in two 175 ml. portions of water with mixing for 30 minutes to obtain two solutions of NaCMC. One of these solutions was mixed with 175 ml. of Soltrol for five minutes in a high speed mixer to obtain emulsion "A." The other NaCMC solution was mixed with another 175 ml. portion of Soltrol, in which had been dispersed 1.23 ml. (1.0 gram) of Arquad 2T for five minutes in a high speed mixer to obtain emulsion "B."

Equal portions (250 ml.) of each of emulsions "A" and "B" were poured in separate 250 ml. graduates and allowed to stand. Emulsion "A" (containing no Arquad 2T) settled so fast that equal volumes of oil and water phase were not obtained in the graduate. At the end of 1 minute, emulsion "A" had separated almost completely into an oil phase and a water phase; the line of separation between the two phases was at the 112 ml. mark on the graduate. Emulsion "B" (containing Arquad 2T) did not separate or visibly settle at the end of two hours, indicating a tight and stable water-in-oil emulsion can be obtained by forming the novel emulsifier of my invention in situ.

*Example II*

The following experiment was carried on to determine whether or not another novel emulsifier of my invention would stabilize water-in-oil emulsions containing well-known clayey materials and impart the desirable characteristics of a water-in-oil emulsion drilling fluid thereto.

A water phase was prepared by mixing 210 ml. of water with 1 gram of bentonite and 1 gram of "EZ Mix," a commercial composite mud additive. The water phase was then mixed for 30 minutes in a high speed mixer with 140 ml. of Soltrol 180 containing 3 grams of Arquad 2HT to obtain water-in-oil emulsion "C."

A second water phase was prepared as above but in addition containing 1 gram of NaCMC. This water phase was mixed for 30 minutes with 140 ml. of Soltrol 180 containing 2 grams of Arquad 2HT to obtain water-in-oil emulsion "D."

The viscosity of filtration losses were then determined and the results obtained are as follows:

| Emulsion | Fann V-G meter | | | Fluid loss (ml. Emulsion) |
|---|---|---|---|---|
| | 600 r. p. m. | 300 r. p. m. | 3 r. p. m. | |
| "C" (Arquad 2HT only) | 7 | 4 | 1 | 16 |
| "D" (Arquad 2HT and NaCMC) | 79 | 50 | 2 | 2.2 |

After the above-determinations, the emulsions were allowed to stand for two days. By the end of this period of time, emulsion "C" had settled. emulsion "D," however, did not settle and remained a stable, tight water-in-oil emulsion.

*Example III*

The following experiment was carried out to determine the effect of calcium chloride and lime (calcium hydroxide) on water-in-oil emulsions stabilized with my novel emulsifier.

Five emulsions were prepared, the components of which were as follows:

| Components | Emulsion | | | | |
|---|---|---|---|---|---|
| | 1 | 2 | 3 | 4 | 5 |
| Water Phase: | | | | | |
| Water (ml.) | 150 | 150 | 150 | 150 | 150 |
| NaCMC (g.) | 1 | 1 | 1 | 1 | 1 |
| Oil phase: | | | | | |
| Soltrol 170 (ml.) | 150 | 150 | 150 | 150 | 150 |
| Arquad 2 HT (g.) | 0 | 0 | 0 | 2 | 2 |
| Added to emulsion: | | | | | |
| Calcium Chloride (g.) | 0 | 60 | 60 | 60 | 60 |
| Calcium Hydroxide (g.) | 0 | 0 | 2 | 0 | 2 |

In preparing the above water phases, the NaCMC was added to the water and stirred for 30 minutes. In preparing the above oil phases of emulsions 4 and 5, the Arquad 2HT was added to the oil and stirred for 2 minutes. All of the oil phases were added to the respective water phases and the resulting mixtures were stirred 15 minutes. Calcium chloride was added to all of the resulting emulsions (except emulsion 1) and all emulsions mixed for 15 minutes. After addition of calcium hydroxide to emulsions 3 and 5, all emulsions were stirred for 15 minutes. The following results were noted.

Emulsion 1 broke quickly and a haze remained in the lower phase. Emulsion 2 formed a viscous oil-in-water emulsion. Emulsion 3 soon separated into a lower clear liquid phase and an upper phase of gelled oil-in-water emulsion. Emulsions 4 and 5 (containing novel emulsifiers of my invention) were fluid water-in-oil emulsions. (The calcium hydroxide was added to Emulsion 5 to make the water phase less corrosive to metals.)

*Example IV*

The following experiment was carried out to show the applicability of water-in-oil emulsions stabilized according to the practice of my invention in drilling fluids.

A water phase was prepared by mixing 157 ml. of water for 30 minutes with 1 gram of NaCMC. An oil phase was prepared by mixing 157 ml. of Soltrol 170 for 20 minutes with 2 grams of Arquad 2HT. The oil phase was then mixed for 15 minutes with the water phase to obtain a water-in-oil emulsion.

To the prepared water-in-oil emulsion, the following materials were added with 15 minute mixing after each addition:

|  | Grams |
|---|---|
| Calcium chloride | 60 |
| Calcium hydroxide | 2 |
| McCracken Clay | 10 |

The drilling fluid obtained was a water-in-oil emulsion drilling fluid which had the following properties:

| Apparent viscosity | 20 cp. |
|---|---|
| Plastic viscosity | 17. |
| Yield value | 6 lb./100 sq. ft. |
| Fluid loss: | |
| Water | 0.1 ml. |
| Oil | 0.9 ml. |
| Total | 1.0 ml. |

*Example V*

The following experiment was carried out in order to demonstrate the superior emulsifying properties of my novel emulsifier as compared to that of ammonium carboxymethyl cellulose. Two emulsions were prepared, the components of which were as follows:

| Components | Emulsion "E" | Emulsion "F" |
|---|---|---|
| Water phase: | | |
| Water ml | 130 | 130 |
| Carboxymethyl cellulose free acid (CMC) g | 1 | 1 |
| Aqua Ammonia (conc.) ml | 20 | 20 |
| Oil Phase: | | |
| Soltrol 170 ml | 150 | 150 |
| Arquad 2HT gm | 0 | 2 |

The above water-phase components were mixed for 15 minutes with the excess ammonium removed by placing them in an oven at 105° C. for 15 minutes. The Arquad 2HT and oil (emulsion "F") were mixed 2 minutes. The oil phases were added to the respective water phases and the resulting mixtures mixed 5 minutes. Emulsion "F" was a good, stable oil-in-water emulsion; emulsion "E" broke almost immediately.

Fifty grams of calcium chloride were added to each emulsion and then mixed for 10 minutes. Emulsion "E" became an oil-in-water emulsion. Emulsion "F" inverted to a water-in-oil emulsion. Ten grams of McCracken Clay were added to both emulsions and the following mud properties were determined.

| Emulsion | Fann V-G Meter | | | Fluid loss, ml. |
|---|---|---|---|---|
| | 600 r. p. m. | 300 r. p. m. | 3 r. p. m. | |
| "E" | 137 | 85 | 1 | 5.5 (emulsion). |
| "F" | 31 | 17 | 1 | 0.9 (oil). |

It will be obvious to those skilled in the art that many alterations and modifications in the preparation and reacting conditions of my novel emulsifiers, in drilling fluid compositions, etc., may be made and yet remain within the intended spirit and scope of my invention.

I claim:

1. A well drilling fluid comprising an emulsion of oil and water stabilized by a quaternary ammonium cellulosic derivative formed by reacting a carboxyalkyl cellulose compound with a quaternary ammonium compound having at least one long-chain aliphatic radical with 8 to 20 carbon atoms.

2. A well drilling fluid comprising an emulsion of oil and water stabilized by a quaternary ammonium cellulosic derivative formed by reacting a carboxyalkyl cellulose compound with a quaternary ammonium compound having the following structural formula:

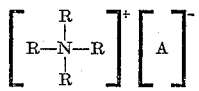

wherein at least one of said R groups is an aliphatic radical having from 8 to 20 carbon atoms, the remaining R groups are selected from the group consisting of lower alkyl and benzyl radicals, and said A group is an anion.

3. A well drilling fluid according to claim 2 wherein said emulsion is of the water-in-oil type.

4. A well drilling fluid according to claim 2 wherein said emulsion is of the oil-in-water type.

5. A well drilling fluid according to claim 2 wherein said carboxyalkyl cellulose compound is carboxymethyl cellulose ether.

6. A well drilling fluid according to claim 2 wherein said anion is a monovalent anion.

7. A well drilling fluid according to claim 2 wherein said carboxyalkyl cellulose compound is selected from the group consisting of carboxyalkyl cellulose ethers and water-soluble alkali metal, alkaline earth, and ammonium salts thereof.

8. A well drilling fluid according to claim 2 wherein said carboxyalkyl cellulose compound is carboxyethyl cellulose ether.

9. A well drilling fluid according to claim 2 wherein said carboxyalkyl cellulose compound is sodium carboxymethyl cellulose.

10. A well drilling fluid according to claim 2 wherein said oil is a highly-branched, heavy alkylate petroleum fraction.

11. A well drilling fluid according to claim 2 wherein said carboxyalkyl cellulose compound is ammonium carboxymethyl cellulose.

12. A well drilling fluid according to claim 2 wherein said quaternary ammonium compound is an alkyl trimethylammonium chloride.

13. A well drilling fluid according to claim 2 wherein said quaternary ammonium compound is a dialkyl dimethyl ammonium chloride.

14. A well drilling fluid according to claim 2 wherein said quaternary ammonium cellulosic derivative is present in the range between 0.5 and 10 pounds per 42 U. S. gallons barrel of drilling fluid.

15. A well drilling fluid according to claim 2 wherein said quaternary ammonium cellulosic derivative is present in the range between 1.0 and 5 pounds per 42 U. S. gallons barrel of drilling fluid.

16. A well drilling fluid comprising an emulsion of oil and water, inorganic solid material, and a small but stabilizing amount of a quaternary ammonium carboxyalkyl cellulose derivative formed by reacting a carboxyalkyl cellulose salt with a quaternary ammonium compound having the following structural formula:

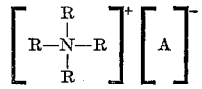

wherein at least one of said R groups is a long-chain alkyl radical having from 8 to 20 carbon atoms, the remaining R groups lower alkyl radicals, and said A group is a halogen anion.

17. A well drilling fluid according to claim 16 wherein said emulsion is a water-in-oil emulsion wherein the amount of oil is in the range between 20 and 95 percent by weight of the drilling fluid.

18. A well drilling fluid according to claim 16 wherein said emulsion is an oil-in-water emulsion wherein the amount of oil is in the range between 2 and 40 percent by weight of the drilling fluid.

19. A well drilling fluid according to claim 16 wherein said cellulose salt is sodium carboxymethyl cellulose.

20. A well drilling fluid according to claim 16 wherein said quaternary ammonium compound is dodecyltrimethylammonium chloride.

21. A well drilling fluid according to claim 16 wherein said quaternary ammonium compound is dioctadicyldimethylammonium chloride.

22. A well drilling fluid according to claim 16 wherein said quaternary ammonium compound is didocyldimethylammonium chloride.

23. A well drilling fluid according to claim 16 wherein said quaternary ammonium compound is dihexadecyldimethylammonium chloride.

24. In a process for drilling a well with well drilling tools wherein there is circulated in said well a drilling fluid, the improvement comprising circulating as a drilling fluid therein a fluid in the form of an emulsion of oil and water stabilized by a quaternary ammonium cellulosic derivative formed by reacting a carboxyalkyl cellulose compound with a quaternary ammonium compound having at least one long-chain aliphatic radical with 8 to 20 carbon atoms.

25. In a process for drilling a well with well drilling tools wherein there is circulated in said well a drilling fluid, the improvement comprising circulating as a drilling fluid therein a fluid in the form of an emulsion of oil and water stabilized by a quaternary ammonium cellulosic derivative formed by reacting a carboxyalkyl cellulose compound with a quaternary ammonium compound having the following structural formula:

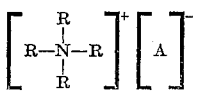

wherein at least one of said R groups is an aliphatic radical having from 8 to 20 carbon atoms, the remaining R groups are selected from the group consisting of lower alkyl and benzyl radicals, and said A group is an anion.

26. The process according to claim 25 wherein said emulsion is of the water-in-oil type wherein the amount of oil is in the range between 20 and 95 percent of the drilling fluid.

27. The process according to claim 25 wherein said emulsion is of the oil-in-water type wherein the amount of oil is in the range between 2 and 40 percent by weight of the drilling fluid.

28. The process according to claim 25 wherein said carboxyalkyl cellulose compound is sodium carboxymethyl cellulose.

References Cited in the file of this patent

UNITED STATES PATENTS

| 2,509,588 | Dawson | May 30, 1950 |
| 2,578,888 | Kaveler | Dec. 18, 1951 |
| 2,582,323 | Fischer | Jan. 15, 1952 |